(12) United States Patent
Koyama et al.

(10) Patent No.: US 7,896,983 B2
(45) Date of Patent: Mar. 1, 2011

(54) HOLLOW STABILIZER AND METHOD OF MANUFACTURING THE SAME

(75) Inventors: Hiroshi Koyama, Yokohama (JP); Koichi Tamatsu, Yokohama (JP); Masato Sugawara, Yokohama (JP); Jun Umeno, Yokohama (JP); Hiroshi Machida, Yokohama (JP); Hiroshi Masuya, Yokohama (JP); Fumiaki Kimura, Yokohama (JP); Yasuaki Tsuji, Yokohama (JP); Akihiro Katsuya, Yokohama (JP); Takahiro Nakamura, Yokohama (JP)

(73) Assignee: NHK Spring Co., Ltd., Kanagawa (JP)

( * ) Notice: Subject to any disclaimer, the term of this patent is extended or adjusted under 35 U.S.C. 154(b) by 129 days.

(21) Appl. No.: 11/429,983

(22) Filed: May 9, 2006

(65) Prior Publication Data

US 2006/0200990 A1    Sep. 14, 2006

Related U.S. Application Data

(62) Division of application No. 10/091,586, filed on Mar. 7, 2002, now abandoned.

(30) Foreign Application Priority Data

Mar. 8, 2001    (JP) ............................. 2001-064906
Nov. 5, 2001    (JP) ............................. 2001-339846

(51) Int. Cl.
    *C21D 9/08*    (2006.01)
(52) U.S. Cl. ...................... 148/519; 148/590; 148/593; 72/53; 72/283; 29/897.2

(58) Field of Classification Search .................. 148/519, 148/559, 590, 593; 72/53, 283; 29/897.2
See application file for complete search history.

(56) References Cited

U.S. PATENT DOCUMENTS 4,378,122 A * 3/1983 Ohno et al. .................. 267/273

(Continued)

FOREIGN PATENT DOCUMENTS

EP    1 029 720    2/2000

(Continued)

OTHER PUBLICATIONS

Development of Manufacturing Technologies for ERW-SR Pipe in Coil (Together with English Translation of the Relevant Portion of Art).

(Continued)

*Primary Examiner*—Jessica L Ward
*Assistant Examiner*—Devang R Patel
(74) *Attorney, Agent, or Firm*—Arent Fox LLP (57) ABSTRACT

In a method of manufacturing a hollow stabilizer, a pipe compressing step of compressing an electroseamed pipe in a temperature range of a hot state or a warm state so as to make a rate of a thickness with respect to an outer diameter between 18 and 35% is performed, and a forming step of forming the compressed electroseamed pipe in a stabilizer shape in a cold state is executed. Next, a step of applying a heat treatment to a half-finished stabilizer is performed, a shot peening step of impacting a shot on the half-finished stabilizer is performed, and a step of coating the half-finished stabilizer is performed.

1 Claim, 4 Drawing Sheets

U.S. PATENT DOCUMENTS

| | | | |
|---|---|---|---|
| 4,526,628 | A | 7/1985 | Ohno et al. |
| 4,781,054 | A | 11/1988 | Brown et al. |
| 4,854,150 | A | 8/1989 | Brown et al. |
| 5,588,209 | A * | 12/1996 | Fisher et al. .............. 29/897.2 |
| 6,206,932 | B1 | 3/2001 | Siecinski et al. |
| 6,682,610 | B1 | 1/2004 | Inoue |

FOREIGN PATENT DOCUMENTS

| | | |
|---|---|---|
| EP | 02 00 5196 | 10/2003 |
| FR | 2 782 661 | 8/1998 |
| JP | 62-224421 | 2/1987 |
| JP | 63-273541 | 10/1988 |
| JP | 01-111848 | 4/1989 |
| JP | 07-089325 | 4/1995 |
| JP | 07-237428 | 12/1995 |
| JP | 2000-233625 | 8/2000 |

OTHER PUBLICATIONS

Kawasaki Steel GIHO, vol. 32, No. 1, 2000 (Together with English Translation of the Relevant Portion of Art).

Nikkei Mechanical, No. 528, 1998 (Together with English Translation of the Relevant Portion of Art).

Design of the Hollow Stabilizer (Together with English Translation of the Relevant Portion of Art).

Development of High Strength and Excellent Formability Steel Tube with Spheroidized Cementite by Warm Reducing Process (Together with English Translation of the Relevant Portion of Art).

* cited by examiner

Fig. 6

HOLLOW STABILIZER AND METHOD OF MANUFACTURING THE SAME

CROSS-REFERENCE TO RELATED APPLICATIONS

This is a Divisional Application, which claims the benefit of U.S. patent application Ser. No. 10/091,586, filed, Mar. 7, 2002 now abandoned. The disclosure of the prior application is hereby incorporated herein in its entirety by reference.

BACKGROUND OF THE INVENTION

1. Technical Field

The present invention relates to a method of manufacturing a hollow stabilizer used for vehicles such as automobiles or the like, and more particularly, relates to a technology for increasing durability as much as possible.

2. Related Art

In recent years, stabilizers are mounted on most vehicles for the purpose of increasing roll rigidity. A stabilizer includes a solid stabilizer using a round bar as a material, and a hollow stabilizer using a pipe as a material for the purpose of saving weight. In the stabilizer, a spring constant is set for each type of automobile in order to obtain the roll rigidity required for the automobile. Accordingly, a wire diameter is selected for the solid stabilizer. In the case of changing the design from a solid stabilizer to a hollow stabilizer in order to reduce the weight of the automobile, the outer diameter of the hollow stabilizer necessarily becomes larger than the wire diameter of the solid stabilizer in order to maintain the roll rigidity. As a result, in the hollow stabilizer, in the case in which the same load as a load applied to the solid stabilizer is applied, the generated stress is larger in the hollow stabilizer. An increasing rate of stress depends on the thickness ratio (thickness t/outer diameter D) of the steel pipe constituting the pipe and a weight saving rate required in the hollow stabilizer.

Accordingly, in order to make it possible to change a design from a solid stabilizer to a hollow stabilizer, it is necessary to select an optimum steel pipe for the material, apply a heat treatment, contrive a bending method so as to minimize damage such as compression of a bent portion or the like, and to apply a shot peening to an outer surface so as to improve durability, and the like.

Figure 6:
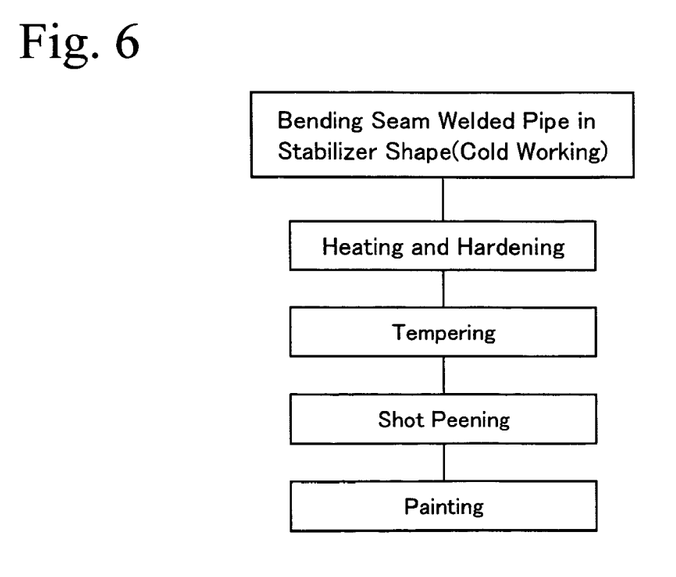
FIG. 6 is a flow chart showing a method of manufacturing a hollow stabilizer in accordance with a conventional art.

FIG. 6 shows a flow of a general method of manufacturing a conventional hollow stabilizer. An inexpensive electroseamed pipe is employed as a material of the hollow stabilizer, and the electroseamed pipe is cut at a predetermined length and is bent in a stabilizer shape. An NC bender or the like is used for the bending formation. In the NC bender, in order to restrict the compression of the material at the time of bending, the bending operation is executed while clamping an outer periphery of the electroseamed pipe by a bending roll and a bending piece moving along an outer periphery of the bending roll. Next, a heat treatment comprising a heating, a hardening, and a tempering is applied to a bent product, a shot peening is applied thereto, and thereafter, a coating process is applied thereto, whereby the hollow stabilizer is formed.

Most of the hollow stabilizer is formed by a material constituted by a thin electroseamed pipe having a thickness ratio (t/D) between 10 and 17%. Further more, a bead formed at the time of welding is left on an inner peripheral surface of the electroseamed pipe, constituting a defect. Accordingly, in order to make it possible to change the design to the hollow stabilizer formed by the electroseamed pipe as the material, it is necessary to consider an application of a heat treatment, a minimization of damage such as the compression of the bent portion due to the contrivance of the bending method, a detection and control of a bead position, an application of the shot peening and the like. Further more, in view of the material, it is necessary to employ a thick electroseamed pipe so as to make the outer diameter as close as possible to the outer diameter of the solid stabilizer, thereby reducing stress. Further more, in order to put the contrivance in the manufacturing step and the material side into practice as the design change of the hollow stabilizer, it is important how much the durability of the presently employed solid stabilizer satisfies the durability required by a user with a surplus.

Further more, as a result of improving the fatigue life of an outer surface portion in accordance with the shot peening, an inner surface portion of the hollow stabilizer to which the shot peening is not generally applied sometimes becomes a portion having the lowest fatigue strength in spite of generated stress being less than that at the outer surface. Since the thickness ratio of the conventional hollow stabilizer is generally about 15%, a difference in stress between the outer surface portion and the inner surface portion is small. As a result, a starting point of a fatigue failure frequently moves from the outer surface portion to the inner surface portion due to the shot peening. Accordingly, in order not to halve an effect obtained by applying the shot peening to the outer surface portion, it is desirable to make the design so that the inner surface portion is not the starting point of the fatigue failure.

Further more, the hollow stabilizer is generally bent in a cold state by the NC bender having a general purpose. In this process, the compression of the material in the bent portion causes a reduction in the fatigue strength. In addition, in order to improve a production tact, there is a requirement of bending respective portions to be processed in the heated electroseamed pipe in a lump by using a general bending mold. The process mentioned above can be mostly executed under the present circumstances because the material is significantly compressed.

In this case, as a method of manufacturing the hollow stabilizer employing the thick electroseamed pipe, there has been known a technique of drawing an electroseamed pipe having a small thickness and a large diameter in a cold state so as to set a thickness ratio between 18 and 20%, and applying a heat treatment and a shot peening after forming. However, in this technique, there is a problem in that the manufacturing cost becomes rather high because the drawing process is executed.

Further more, in Japanese Unexamined Patent Publication No. 2000-233625, there is described a manufacturing method of compressing an electroseamed pipe having a large diameter to a thickness ratio less than 0.2 in a hot state so as to form a raw pipe, drawing the raw pipe in a cold state so as to make the thickness ratio between 0.2 and 0.27, and applying a strain removing annealing and a shot peening after forming. However, in accordance with the manufacturing method, the manufacturing cost becomes rather high because the drawing process is executed, and there is a problem in that the maximum thickness is limited due to a limit in a cold drawing capacity and a range of selection in the design is narrow.

SUMMARY OF THE INVENTION

An object of the present invention is to provide a method of manufacturing a hollow stabilizer which can obtain a desired thickness in accordance with an inexpensive manufacturing step so as to obtain a required durability, whereby a range of selection in design is wide and it is possible to easily correspond to a design change from a solid stabilizer to a hollow stabilizer. Further more, another object of the present invention is to provide a hollow stabilizer which can maximally generate a fatigue failure in an outer surface portion and sufficiently achieve an effect of a shot peening applied to the outer surface portion.

In accordance with the present invention, there is provided a method of manufacturing a hollow stabilizer, comprising: a pipe compressing step of compressing an electroseamed pipe in a temperature range of a hot state or a warm state so as to make a rate of a thickness with respect to an outer diameter between 18 and 35%; a forming step of forming the compressed electroseamed pipe in a stabilizer shape in a cold state; a step of applying a heat treatment to a half-finished stabilizer; a shot peening step of impacting a shot on the half-finished stabilizer; and a step of coating the half-finished stabilizer.

In accordance with the manufacturing method described above, since the electroseamed pipe is compressed in the temperature range of the hot state or the warm state having a small deformation resistance, it is possible to easily obtain a thick pipe having a large thickness ratio, even in a material having a good hardening property. In this case, the hot state means a temperature range equal to or greater than an A3 transformation point, and the warm state means a temperature range equal to or less than the A3 transformation point. Further more, the pipe compression can be executed, for example, by a multistage rolling, and the means is not limited as long as the pipe compression can be executed in the hot state or the warm state.

In the hollow stabilizer of the thin electroseamed pipe, it is possible to improve the strength of the outer surface portion in accordance with the shot peening. However, since a defect such as a bead or the like exists in an inner surface portion, and the processing cost of the shot peening on the inner surface is rather high, this shot peening is not executed very frequently Accordingly, as mentioned above, in a durability test, although the stress is lower at the inner surface portion than at the outer surface, there are many cases in which the inner surface portion becomes a starting point of breakage.

From this point of view, in the present invention, since the thickness ratio is made between 18 and 35% in the pipe compression step, it is possible to make the inner diameter very small. Accordingly, the stress in the inner surface portion can be sufficiently reduced, and it is possible to minimize a reduction in service life caused by the inner surface portion. Further more, in accordance with the present invention, since the shot peening is applied to the half-finished stabilizer, it is possible to broadly improve durability together with improving fatigue strength in the inner surface portion. Accordingly, it is possible to obtain a desired durability, the range of selection of the design is wide, and it is possible to easily correspond to the design change from a solid stabilizer to a hollow stabilizer. In this case, in manufacturing the electroseamed pipe, a bead cut of an outer periphery is normally executed; however, a bead cut of an inner periphery also be can executed. Accordingly, it can be considered that an electroseamed pipe having no inner peripheral bead is employed in some required specifications.

In the manufacturing method described above, the forming step of forming the electroseamed pipe in the stabilizer shape is executed in the cold state. For this cold forming, an NC bender capable of forming substantially in an optional shape may be used for general purposes. Further more, since the thickness ratio is equal to or greater than 18%, there is an advantage in that it is possible to restrict the compression of the material. In order to securely prevent the material from being compressed, it is desirable to set the thickness ratio after compressing the pipe to 20% or more, and it is further preferable to set it to 25% or more, or to more than 27%.

In contrast, in the case in which it is required to shorten the forming tact, it should be considered to bend the respective portions to be formed in the heated electroseamed pipe such as the solid stabilizer in a lump by using the general bending mold. In this case, if the electroseamed pipe having a thickness ratio equal to or more than 18% is employed, not very much compression is generated even when bending in a lump by using the general bending mold, so that it is possible to execute the bending in a lump in a hot state. Even in this case, in order to securely prevent the compression in bending in a lump in a hot state, it is desirable to set the thickness ratio after compressing the pipe to 20% or more, and it is further preferable to set it to 25% or more, or to more than 27%.

Further more, even when the thickness ratio is less than 18%, in the case in which the compressed state at a time of bending generates no problem in view of durability, it is possible to employ the same forming method as that of the solid stabilizer. Whether the forming is executed in a cold state or the forming is executed in a hot state by employing the general mold is selected on the basis of a case in which the production amount is small and the cost is advantageous even when a tact is a little slow in comparison with a preparation of an exclusive general bending mold, or a case in which the cost is advantageous in a fast processing tact, that is, it is possible to select a method which is advantageous in cost according to particular cases.

As mentioned above, in accordance with another aspect of the present invention, there is provided a method of manufacturing a hollow stabilizer, comprising: a pipe compressing step of compressing an electroseamed pipe in a temperature range of a hot state or a warm state so as to make a rate of a thickness with respect to an outer diameter between 18 and 35%; a forming step of forming the compressed electroseamed pipe in a stabilizer shape in a cold state; a step of applying a heat treatment to a half-finished stabilizer; a shot peening step of impacting shot on the half-finished stabilizer; and a step of coating the half-finished stabilizer.

In this case, the thickness ratio after compressing the pipe is made equal to or less than 35%, because the hollow stabilizer having a thickness more than 35% can hardly achieve the weight saving. Taking this point into consideration, it is desirable that the thickness ratio after compressing the pipe be equal to or less than 30%, and in this case, it is possible to achieve a weight saving equal to or greater than 20%. Further more, a hardening and a tempering are typical for the heat treatment in the present invention. In this case, it is possible to apply a stress removing annealing after processing without executing the heat treatment.

Next, the inventors of the present invention have researched the relationship between the thickness ratio of the hollow stabilizer and the shot peening applied to the outer surface portion. As mentioned above, when applying the shot peening to the outer surface portion, there are cases in which fatigue failure is generated in the inner surface portion in which the stress is lower than that of the outer surface portion. As a result of quantitatively analyzing the relationship between the fatigue failure and the thickness ratio, the inventors have found that there is generated a strong tendency in which the fatigue failure is generated on the outer surface portion in the hollow stabilizer to which the shot peening is applied when the thickness is equal to or greater than 18%.

The hollow stabilizer in accordance with the present invention is made on the basis of the knowledge mentioned above, and is characterized by bending the material obtained by compressing the electroseamed pipe in the temperature range of the hot state or the warm state so as to make the ratio of the thickness with respect to the outer diameter between 18 and 35%, whereby the thickness ratio is made between 18 and 35% and the shot peening is applied to the outer surface portion.

In the hollow stabilizer mentioned above, since the shot peening is applied to the outer surface portion, the fatigue strength in the outer surface portion is improved, and since the thickness ratio is equal to or greater than 18%, the fatigue strength of the inner surface portion is relatively improved with respect to the outer surface portion, and the fatigue failure is easily generated in the outer surface portion. Accordingly, it is possible to satisfactorily obtain an effect by applying the shot peening to the outer surface portion. In this case, due to the reason mentioned above, it is desirable that the thickness ratio be equal to or less than 30%. Further more, it is desirable that the thickness ratio be equal to or greater than 20%, and it is further preferable that the thickness ratio be equal to or greater than 25%, and further, more than 27%.

DETAILED DESCRIPTION OF THE PREFERRED EMBODIMENT

Figure 1:
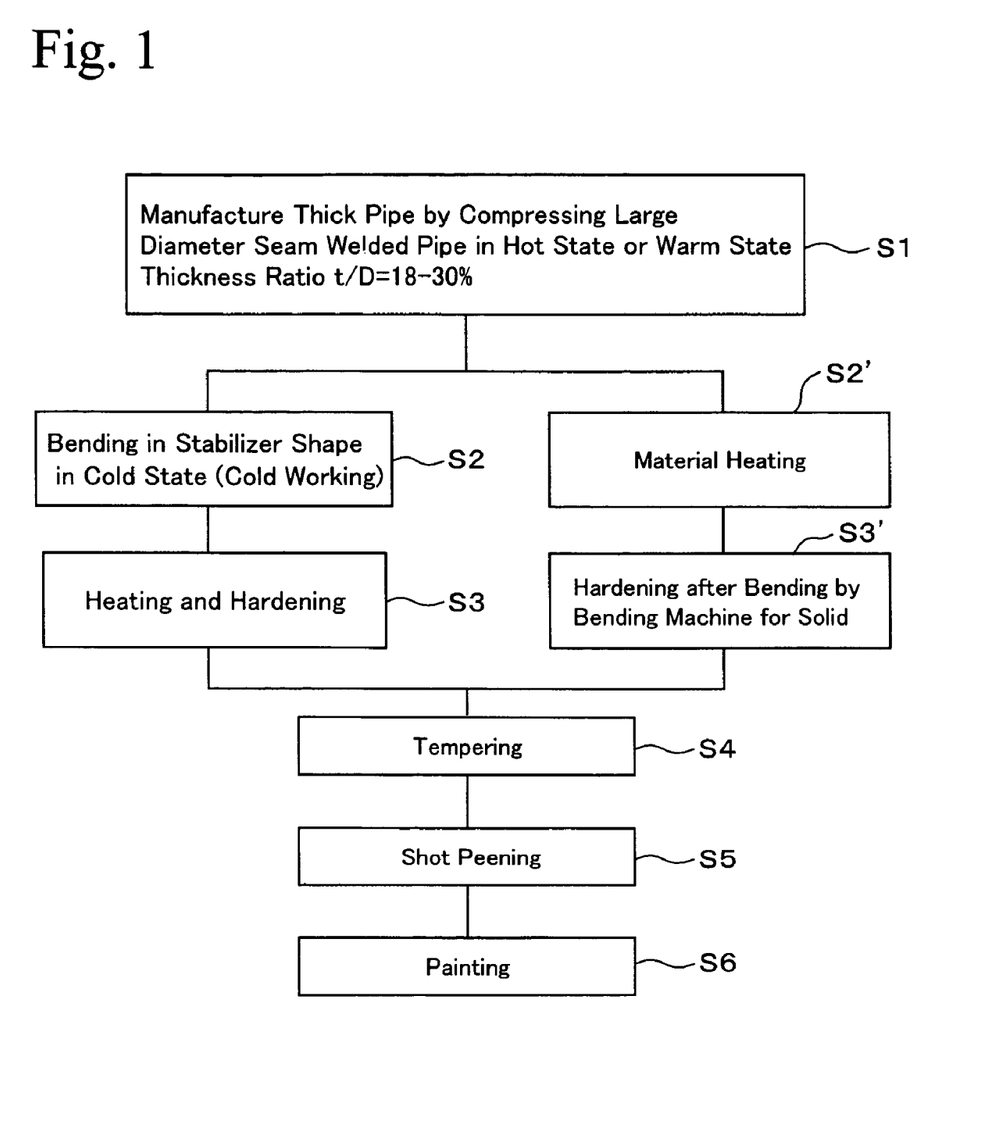
FIG. 1 is a flow chart showing a method of manufacturing a hollow stabilizer in accordance with the present invention.

A description will be given below of an embodiment in accordance with the present invention with reference to FIGS. 1 and 2. FIG. 1 is a flowchart showing a method of manufacturing a hollow stabilizer in accordance with the embodiment. In this manufacturing method, first, an electroseamed pipe having a diameter larger than an outer diameter of a hollow stabilizer to be manufactured is compressed in a temperature range under a hot state or a warm state, whereby a thickness ratio (t/D) is made between 18 and 35% (S1). Next, the electroseamed pipe cut in a predetermined length is formed in a stabilizer shape in accordance with a cold working (S2). In this case, for example, an NC bender can be employed for this formation. Further more, a press forming is applied to a terminal before or after the formation.

Next, a half-finished stabilizer is heated and is cast in a hardening tank so as to be hardened (S3). For the hardening heating, an electric resistance heating in which both end portions of the half-finished stabilizer are clamped by electrodes and an electric current is applied is preferable because a deformation of the half-finished product is reduced and the cost of equipment is low. In this case, it is possible to perform an ambient atmosphere heating applied by a heating furnace. Further more, as a hardening agent, in the case in which a hardening property of a material is high, a hardening oil is employed; however, in the case in which the hardening property is low, salt water may be employed in some cases. In the case of executing the hardening by using water or salt water, since the half-finished stabilizer is surrounded by water vapor and the cooling rate is reduced, it is desirable to move it in the hardening tank so as to drain off the water vapor.

Next, a tempering is applied to the half-finished stabilizer (S4), a shot peening is applied mainly to a shoulder portion (S5), and thereafter a coating is performed so as to obtain a hollow stabilizer. The above corresponds to steps in the case of forming the electroseamed pipe in a cold state; however, in the case of forming in a hot state, the right side steps in FIG. 1 apply.

In the formation of the solid stabilizer, respective portions to be processed in the heated material are bent in a lump by using a general bending mold, and this forming method can be applied to the formation of the hollow stabilizer. Accordingly, in the case of employing this forming method, first, the electroseamed pipe is heated (S2'), the electroseamed pipe is bent by the general bending mold, and thereafter is cast in the hardening tank so as to be hardened (S3').

Figure 2A:
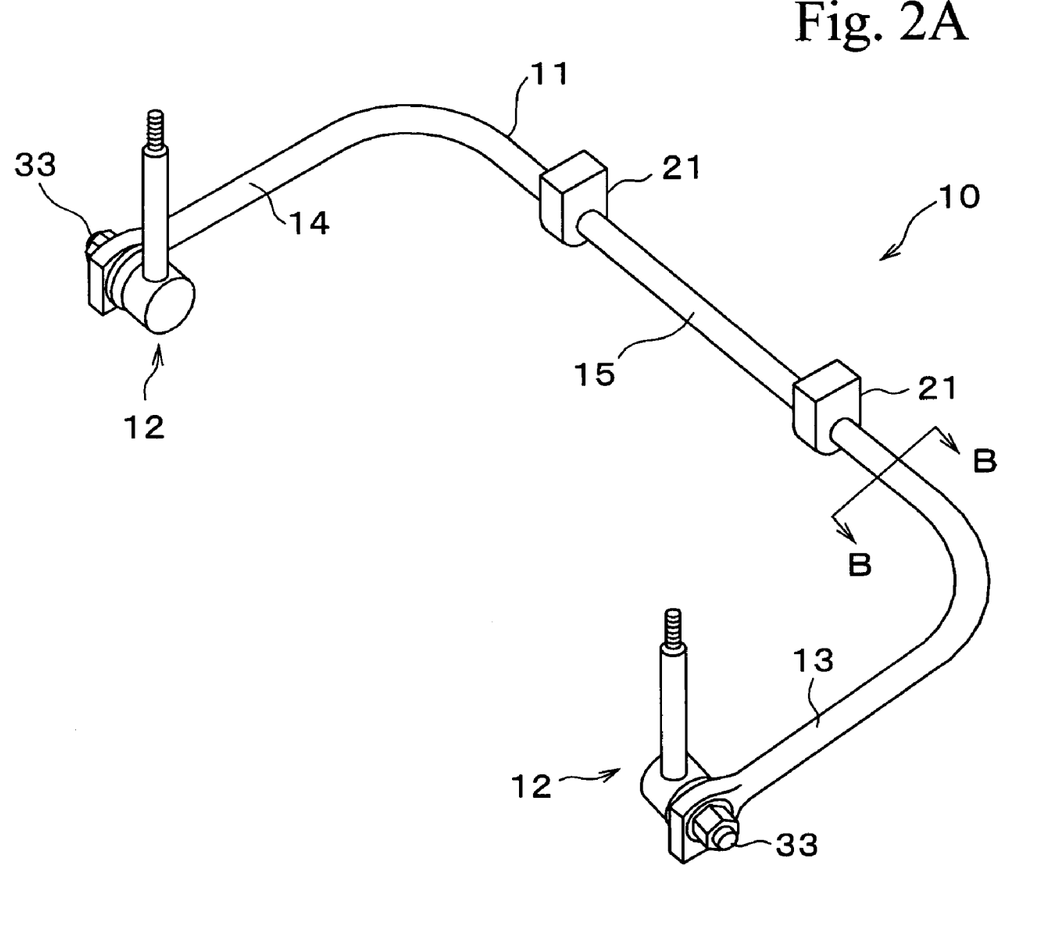
FIG. 2A is a perspective view showing a hollow stabilizer in accordance with an embodiment of the present invention.
Figure 2B:
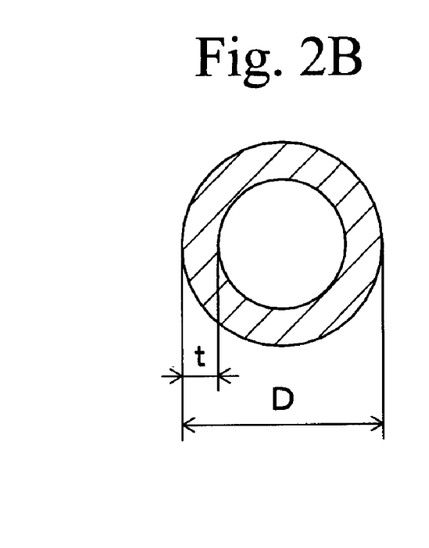
FIG. 2B is a cross sectional view along line B-B in FIG. 2A.

FIG. 2 is a perspective view showing a stabilizer apparatus 10 for a vehicle to which parts required for a hollow stabilizer 11 manufactured in the manner mentioned above are mounted. The hollow stabilizer 11 is provided with arm portions 13 and 14, and a torsion portion 15 connecting therebetween. A bush 21 for being mounted to a vehicle body of the vehicle is mounted to the torsion portion 15. Further more, a stabilizer control link 12 supported at a wheel side of the vehicle is mounted to a front end portion of each of the arm portions 13 and 14 by a stud 33. Further more, a thickness ratio (t/D) of the hollow stabilizer 11 is set between 18 and 35%. In this case, the stabilizer apparatus for the vehicle can be structured such that the arm portions 13 and 14 are mounted to the vehicle body and the torsion portion 15 is mounted to the wheel side.

EMBODIMENTS

Embodiment 1

Figure 3:
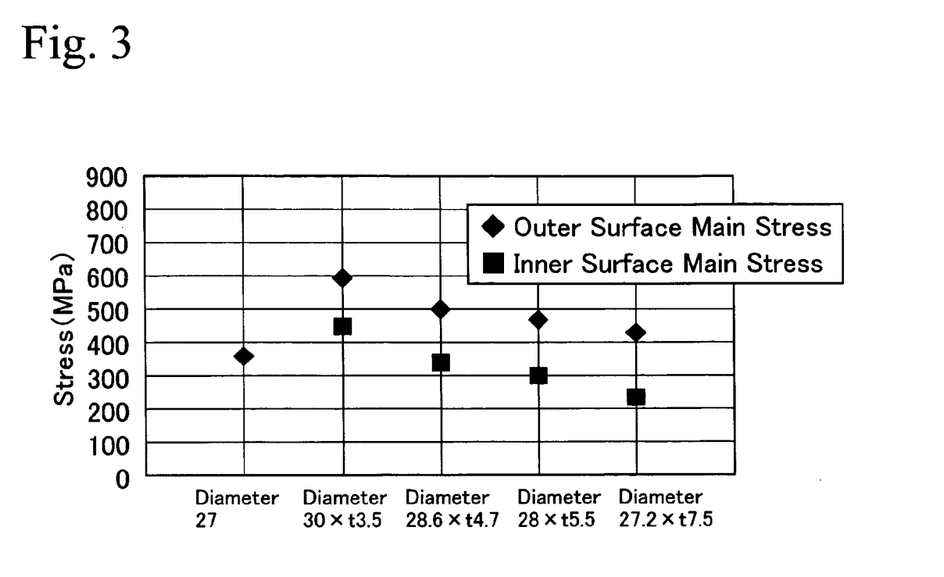
FIG. 3 is a graph showing stresses generated in samples in a first embodiment of the present invention.

Next, particular manufactured embodiments are described and further details of the present invention will be given. Table 1 shows respective specifications of a solid stabilizer having a wire diameter of 27 mm, and a hollow stabilizer having substantially the same spring constant as that of the solid stabilizer. In this case, the respective stabilizers are structured such that the heat treatment, the shot peening, and the coating are applied. Further more, main stresses at the time of imparting a deformation of the same stroke to the respective stabilizers are also described in Table 1, and the values are shown in FIG. 3.

TABLE 1

| No | Material Size | Thickness Ratio (t/D) | Spring Constant (N/mm) | Main Stress at Outer Surface Portion (MPa) | Main Stress at Inner Surface Portion (MPa) |
| --- | --- | --- | --- | --- | --- |
| 1 | Solid, Diameter27 | — | 25.1 | 365 | — |
| 2 | Diameter30.0 × t3.5 | 11.7% | 24.9 | 591 | 458 |

TABLE 1-continued

| No | Material Size | Thickness Ratio (t/D) | Spring Constant (N/mm) | Main Stress at Outer Surface Portion (MPa) | Main Stress at Inner Surface Portion (MPa) |
|---|---|---|---|---|---|
| 3 | Diameter28.6 × t4.7 | 16.4% | 24.8 | 499 | 339 |
| 4 | Diameter28.0 × t5.5 | 19.6% | 25.2 | 475 | 304 |
| 5 | Diameter27.2 × t7.5 | 27.6% | 25.1 | 430 | 229 | t: thickness

A sample No. 2 is a thin pipe in which a thickness ratio is 11.7%, and sample No. 5 is a thick pipe in which the thickness ratio is 26.7%. In the thin pipe, the main stress on an inner surface portion is 100% larger than in the thick pipe, and the main stress on an outer surface portion is 37.4% larger than in the thick pipe. Accordingly, it is expected that the durability is considerably deteriorated in comparison with the thick pipe. In other words, since in a durability test, a starting point of breakage is generated on an inner surface, it is possible to infer that the durability of the thick pipe is broadly improved in comparison with that of the thin pipe.

Figure 4:
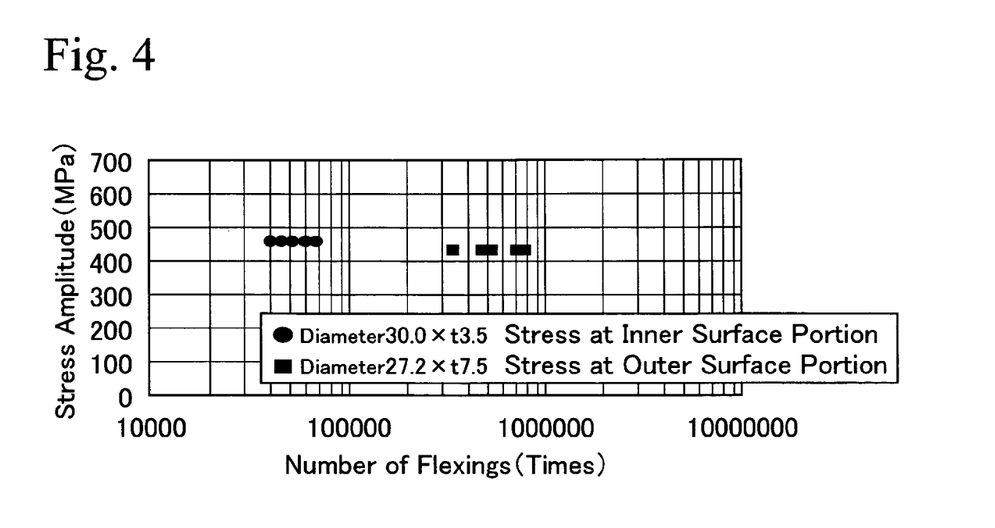
FIG. 4 is a graph showing the relationship between a number of permanence and a stress amplitude in the first embodiment of the present invention.

Next, FIG. 4 shows a result of a durability test of a thin pipe in which the thickness ratio is 11.7% and a thick pipe in which the thickness ratio is 27.6%. In this durability test, all of the hollow stabilizers made of the thin pipes broke at the starting point of the inner surface portion, and all of the thick pipes broke at the starting point of the outer surface portion. Further more, the number of durability of the hollow stabilizer made of the thin pipe is between 41000 and 67000, and in contrast, the number of durability of the hollow stabilizer made of the thick pipe is between 340000 and 785000, which is substantially ten times the number of durability in the case of the thin pipe. The stress amplitude of the inner surface of the hollow stabilizer made of the thin pipe is substantially the same as that of the outer surface of the hollow stabilizer made of the thick pipe. Since, nevertheless, a difference in number of durability mentioned above is generated, it can be said that this is evidence of a tendency of the durability of the hollow stabilizers made of the thin pipe and the thick pipe. Further more, due to the matter mentioned above, it is known that the durability is improved when the thickness ratio is increased from 11.7% to 27.6%.

Embodiment 2

A durability test was performed by employing nine hollow stabilizers having outer diameters and thicknesses as shown in Table 2 and solid stabilizers having a diameter of 25 mm. Furthermore, it was investigated at which of the inner or outer surface portions of the hollow stabilizer the starting point of breakage was generated, a ratio of maximum stresses generated on the inner and outer surfaces (inner surface stress/outer surface stress) is investigated, and the results thereof are also described in Table 2. Further more, a ratio of fatigue life of the hollow stabilizer with respect to a fatigue life of the solid stabilizer and a ratio of mass are calculated, and the results thereof are also described in Table 2. An S-N graph of the hollow stabilizer is shown in FIG. 5.

Figure 5:
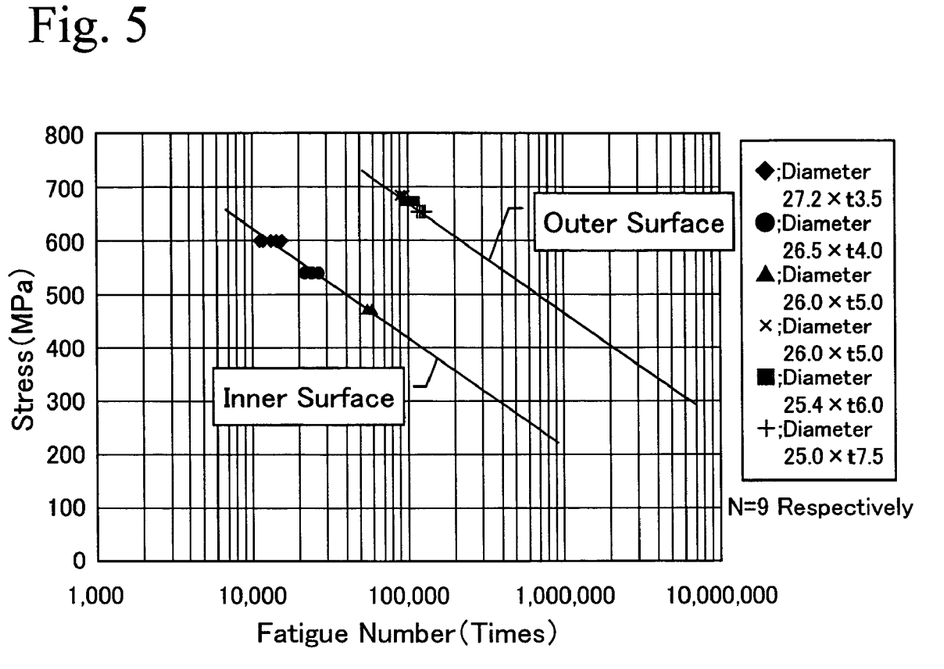
FIG. 5 is a graph showing the relationship between a number of permanence and a stress amplitude in a second embodiment of the present invention.

As shown in Table 2 and FIG. 5, in the hollow stabilizer in which the thickness ratio is equal to or greater than 20%, all of the starting points of breakage exist in the outer surface portion, and a fatigue life of about 100,000 is obtained. In a hollow stabilizer in which the thickness ratio is 19.2%, the starting points of breakage exist in the inner and outer surface portions in a mixed manner; however, a sufficient fatigue life is obtained. Further more, in a hollow stabilizer in which the thickness ratio is equal to or less than 15.1%, the starting points of breakage exist in the inner surface portion, and the fatigue life is greatly reduced in comparison with the structure in accordance with the present invention.

TABLE 2

| Material Size | Diameter 25.0 × t7.5 | Diameter 25.4 × t6.0 | Diameter 26.0 × t5.0 | Diameter 26.5 × t4.0 | Diameter 27.2 × t3.5 | Diameter 25.0 |
|---|---|---|---|---|---|---|
| t/D | 30.0 | 23.6 | 19.2 | 15.1 | 12..9 | — |
| Starting Point of Breakage | Outer Surface | Outer Surface | Exist in Inner and Outer Surfaces in Mixed Manner | Inner Surface | Inner Surface | Outer Surface |
| Stress Ratio of Outer Surface within Pipe | 0.40 | 0.53 | 0.62 | 0.70 | 0.74 | — |
| Ratio of Durability | 1.00 | 1.00 | 0.98 (0.55) | 0.25 | 0.14 | 1.00 |
| Ratio of Mass | 0.78 | 0.64 | 0.54 | 0.43 | 0.36 | 1.00 |

What is claimed is:

1. A method of manufacturing a hollow stabilizer comprising:
 a heating step of heating an electroseamed pipe;
 a pipe compressing step of compressing the electroseamed pipe in a temperature range of only a hot state so as to make a thickness to diameter ratio of more than 27% and equal to or less than 35%;
 a forming step of forming the compressed electroseamed pipe in a stabilizer shape in the hot state to form a half-finished stabilizer;
 a step of applying a heat treatment to the half-finished stabilizer;
 a shot peening step of impacting shot on the half-finished stabilizer; and
 a step of coating the half-finished stabilizer to form the hollow stabilizer,
 wherein the temperature range of the hot state is a temperature range equal to or greater than an A3 transformation point.

* * * * *